(12) United States Patent
Miki et al.

(10) Patent No.: US 8,849,932 B2
(45) Date of Patent: Sep. 30, 2014

(54) DATA TRANSMISSION/RECEPTION SYSTEM AND DATA TRANSMISSION/RECEPTION PROGRAM

(75) Inventors: Sukeichi Miki, Ikoma (JP); Shinichi Miki, Ikoma (JP); Manabu Miki, Ikoma (JP); Hikaru Miki, Ikoma (JP)

(73) Assignee: Visionarist Co., Ltd., Ikoma-shi (JP)

( * ) Notice: Subject to any disclaimer, the term of this patent is extended or adjusted under 35 U.S.C. 154(b) by 128 days.

(21) Appl. No.: 13/698,562

(22) PCT Filed: May 17, 2010

(86) PCT No.: PCT/JP2010/058281
§ 371 (c)(1),
(2), (4) Date: Nov. 16, 2012

(87) PCT Pub. No.: WO2011/114516
PCT Pub. Date: Nov. 24, 2011

(65) Prior Publication Data
US 2013/0067011 A1    Mar. 14, 2013

(51) Int. Cl.
*G06F 15/16* (2006.01)

(52) U.S. Cl.
CPC ............................... *G06F 15/16* (2013.01)
USPC .............................. 709/206; 709/219

(58) Field of Classification Search
USPC ................. 709/206, 219; 707/3, 769, 803, 707/999.104, 999.107; 705/26.5; 715/847; 386/95, 243; 385/37
See application file for complete search history.

(56) References Cited

U.S. PATENT DOCUMENTS

| | | | | |
|---|---|---|---|---|
| 6,009,439 A | * | 12/1999 | Shiomi et al. | 707/999.104 |
| 6,944,629 B1 | * | 9/2005 | Shioi et al. | 707/999.107 |
| 7,747,131 B2 | * | 6/2010 | Seo et al. | 386/243 |
| 7,890,520 B2 | * | 2/2011 | Tsukazaki et al. | 709/219 |
| 8,661,064 B2 | * | 2/2014 | Matsumoto et al. | 707/803 |
| 2002/0049748 A1 | | 4/2002 | Iki et al. | |

(Continued)

FOREIGN PATENT DOCUMENTS

| | | |
|---|---|---|
| JP | 2001-290683 | 10/1920 |
| JP | 7-56789 | 3/1995 |
| JP | 2002-142186 | 5/2002 |
| JP | 2004-274260 A | 9/2004 |

(Continued)

OTHER PUBLICATIONS

International Search Report dated Sep. 14, 2010 with English translation (four (4) pages).

*Primary Examiner* — Quang N Nguyen
(74) *Attorney, Agent, or Firm* — Crowell & Moring LLP

(57) ABSTRACT

Provided is a data transmission/reception system which can display a title created based on an attribute information of a data on a monitor with high visibility. When a command is inputted via an input unit, a CPU creates a title information file used for creating the title, and when the data is created, the CPU creates a title attribute information table. A communication terminal transmits and receives the data and the title attribute information table. The CPU creates the title in accordance with the title information file and the title attribute information table. The monitor displays plural titles on a title list screen. Accordingly, a user can display the plural titles on the monitor with the high visibility. Moreover, the user can easily manage the data in accordance with the title.

12 Claims, 14 Drawing Sheets

(56) References Cited

U.S. PATENT DOCUMENTS

| | | |
|---|---|---|
| 2003/0078918 A1* | 4/2003 | Souvignier et al. ............... 707/3 |
| 2005/0147348 A1* | 7/2005 | Grunnet-Jepsen et al. ..... 385/37 |
| 2006/0174054 A1 | 8/2006 | Matsuki |
| 2008/0049349 A1 | 2/2008 | Nakase et al. |
| 2010/0232764 A1* | 9/2010 | Yamanishi ...................... 386/95 |
| 2011/0106846 A1* | 5/2011 | Matsumoto et al. .......... 707/769 |
| 2012/0117474 A1 | 5/2012 | Miki et al. |
| 2013/0268898 A1* | 10/2013 | Miki et al. .................... 715/847 |
| 2013/0317936 A1* | 11/2013 | Hughes ........................ 705/26.5 |

FOREIGN PATENT DOCUMENTS

| | | |
|---|---|---|
| JP | 2005-258613 A | 9/2005 |
| JP | 2006-209662 A | 8/2006 |
| JP | 2008-53971 A | 3/2008 |
| JP | 4416836 B1 | 2/2010 |

* cited by examiner

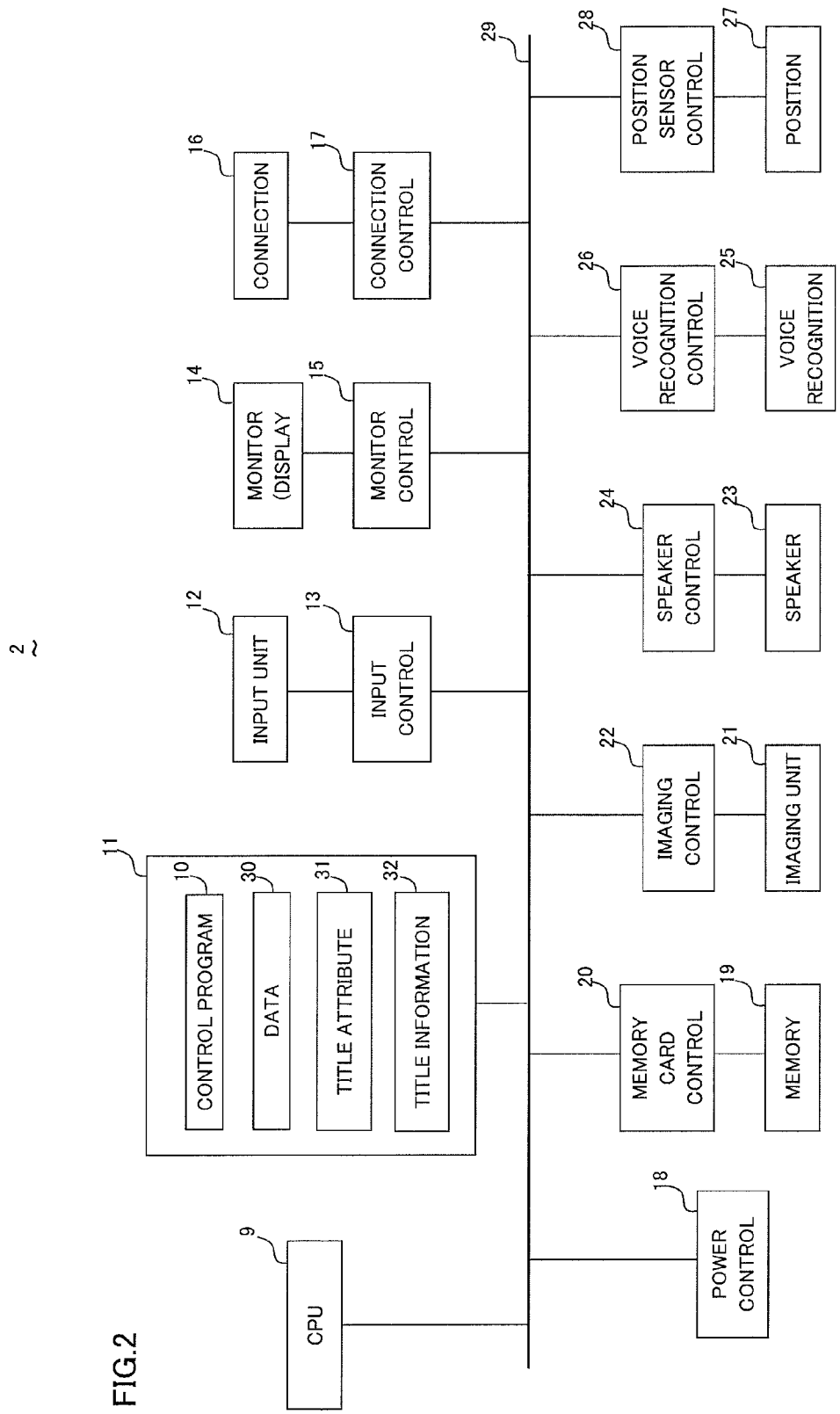

FIG.3

| | | | |
|---|---|---|---|
| 33 | DATE INFORMATION | CREATION DATE | APRIL 15, 2010 | 38 |
| | | UPDATED DATE | APRIL 17, 2010 | 39 |
| | | ACCESS DATE | APRIL 19, 2010 | 40 |
| | | TRANSMISSION DATE | APRIL 22, 2010 | 41 |
| | | RECEPTION DATE | APRIL 22, 2010 | 42 |
| 34 | NAME INFORMATION | OPTIONAL NAME | LECTURE MATERIAL | 43 |
| | | AUTO-CREATION NAME | DOCUMENT 001 | 44 |
| 35 | DATA TYPE INFORMATION | EXTENSION | ABC | 45 |
| | | APPLICATION NAME | WORD-PROCESSING SOFTWARE | 46 |
| 36 | EQUIPMENT INFORMATION | COMPUTER NAME | FINANCE 01 | 47 |
| | | MODEL NAME | XYZ-A | 48 |
| 37 | CREATOR INFORMATION | CREATOR NAME | TARO YAMATO | 49 |
| | | UPDATE PERSON NAME | HANAKO TOKYO | 50 |
| | | ACCESS PERSON NAME | JIRO KANSAI | 51 |
| | | SENDER NAME | SABURO OSAKA | 52 |
| | | RECEIVER NAME | SHIRO KANTO | 53 |

| 58 — DATE INFORMATION | ☑ CREATION DATE | ☐ UPDATED DATE | ☐ ACCESS DATE | ☐ TRANSMISSION DATE | ☐ RECEPTION DATE |
|---|---|---|---|---|---|

| 59 — NAME INFORMATION | ☑ OPTIONAL NAME | ☐ AUTO-CREATION NAME |
|---|---|---|

| 60 — DATA TYPE INFORMATION | ☐ EXTENSION | ☐ APPLICATION NAME |
|---|---|---|

| 61 — EQUIPMENT INFORMATION | ☐ COMPUTER NAME | ☐ MODEL NAME |
|---|---|---|

| 62 — CREATOR INFORMATION | ☐ CREATOR NAME | ☐ UPDATE PERSON NAME | ☐ ACCESS PERSON NAME | ☐ SENDER NAME | ☐ RECEIVER NAME |
|---|---|---|---|---|---|

63 ENTER

FIG.6

| DISPLAY CONTENT | ☐ YEAR | ☐ MONTH | ☐ DATE | ☐ YEAR, MONTH | ☐ MONTH, DATE | ☑ YEAR, MONTH, DATE |
|---|---|---|---|---|---|---|

| DISPLAY FORM | ☐ ERA FORM | ☑ WESTERN CALENDAR FORM |
|---|---|---|
| | ☐ APRIL 12, HEISEI 22 | ☑ 2010. 4. 12 |
| | ☐ APRIL 12, H22 | ☐ APRIL 12, 2010 |
| | ☐ H22. 4. 12 | ☐ APR. 12, 2010 |
| | ☐ HEISEI 22, APRIL 12 | ☐ 4/12/2010 |

ENTER

FIG.14
PRIOR ART
100

| NAME | UPDATED DATE AND TIME | TYPE | SIZE | TAG |
|---|---|---|---|---|
| LECTURE MATERIAL | 2009/11/25 22:22 | FILE FOLDER | 52 MB | TOKYO UNIV. |
| DOCUMENT MATERIAL | 2007/10/15 22:58 | DOCUMENT | 34 MB | INT. CONFERENCE |
| NAME LIST | 2006/12/12 23:54 | FIGURE | 1.2 MB | |
| SPECIAL PROGRAM | 2006/5/15 0:23 | FILE FOLDER | 22 MB | |
| TRAVEL SCHEDULE | 2009/12/25 1:32 | DOCUMENT | 0.5 MB | |
| SELLING CHART | 2009/3/31 2:40 | IMAGE | 3 MB | |
| CLASS MATERIAL | 2008/4/5 11:52 | FILE FOLDER | 12 MB | KYOTO UNIV. |
| GOVERNMENT-RELATED | 2005/11/22 12:13 | FILE FOLDER | 11 MB | |
| TAX-RELATED MATERIAL | 2010/1/5 14:06 | FILE FOLDER | 0.7 MB | |
| EXCHANGE MEETING | 2009/12/7 14:09 | DOCUMENT | 2 MB | TOKYO |
| PRESENTATION MATERIAL | 2003/8/8 17:34 | FILE FOLDER | 30 MB | SELF |
| BUSINESS PLAN | 2008/3/20 18:02 | FIGURE | 21 MB | |
| INSTITUTE OF INFORMATION-COMMUNICATION | 2005/4/21 13:03 | FILE FOLDER | 1.5 MB | |

DATA TRANSMISSION/RECEPTION SYSTEM AND DATA TRANSMISSION/RECEPTION PROGRAM

TECHNICAL FIELD

The present invention relates to a data transmission/reception system and a data transmission/reception program which transmits and receives data together with an attribute information table, which is used for creating a title based on an attribute information of the data, in accordance with a user's instruction and thus can display the title in a form desired by the user on a display screen of a communication terminal such as a personal computer, a mobile phone, or the like with high visibility.

BACKGROUND ART

Recently, recording media such as a memory card, a USB memory, a hard disk, or the like become less expensive and have a large capacity, so that a user stores large amounts of data such as a file or a folder, for example, in a personal computer, a server, a communication terminal, or the like. These large amounts of data are managed by names such as a file name or a folder name, for example, named by the user and an attribute information such as an updated date and time, a type, a size, or the like of the data. As shown in FIG. 14, a list of the attribute information is displayed as a name, an updated date and time, a type, a size, and a tag of the data on a monitor 100 of a computer. Since the listed attribute information often includes information which is not needed for the user to see titles and find and select the desired data quickly, the user cannot easily specify the desired data in accordance with the listed attribute information. Thus, there is a suggestion of a method for providing a title, which is approachable for a user and can make the user easily specify a desired image data from among plural image data, and displaying it on a monitor.

For example, there is a known image data display system in which three types of folder names, that is, a DCF (Design rule for Camera File system) standard name, a shooting period name, and a user theme name based on DCF standard are made up and managed to display two of the DCF standard name, the shooting period name, and the user theme name together while maintaining reproduction compatibility (refer to patent document 1, for example).

However, the technique described in the patent document 1 is intended for an image data which is created by a digital camera complying with the DCF standard, so that it cannot be applied to a text data, an image data, or a video data which does not have the DCF standard name as the attribute information and moreover, a transmission/reception date of the data cannot be used as the title.

PRIOR ART DOCUMENT

Patent Document

Patent document 1: Japanese Patent No. 4416836

SUMMARY OF THE INVENTION

Problems to be Solved by the Invention

The present invention is to solve the problem described above, and an object of the present invention is to provide a data transmission/reception system and a data transmission/reception program which creates a title attribute information table, which is used for displaying a title of data in a form desired by a user, in accordance with an attribute information of the data and transmits and receives the data and the title attribute information table, so that the title useful for the user can be displayed on a monitor with high visibility.

Means to Solve the Problem(s)

The present invention is to solve the problem described above, and an object of the present invention is to provide a data transmission/reception system which includes plural communication terminals and a telecommunication line connected to the communication terminals to transmit and receive data which is made up of a file or a folder, wherein each of the communication terminals includes an input unit to which a character information or an operating command is inputted by a user, a display unit which displays the data, a connection unit which transmits and receives the data via the telecommunication line, a control unit which controls the communication terminal, and a memory unit which stores a control program to control the control unit, wherein the memory unit stores a title attribute information table which is used for creating a title of the data and has an attribute information of the data in association with the data and a title information file which has information for creating the title of the data displayed on the display unit in accordance with the attribute information included in the title attribute information table, the title attribute information table has at least a date information, which has a value regarding a date when the data is created and a date when the data is transmitted or received by the connection unit, and a name information, which has a value regarding a name of the data, the date information has a creation date when the data is newly created, a transmission date when the data is transmitted by the connection unit, or a reception date when the data is received by the connection unit, the name information has an optional name which a user optionally provides as a name of the data via the input unit, the title information file has two values which a user selects via the input unit from the values included in the date information or the name information, the control unit makes the connection unit transmit the data and the title attribute information table to the other communication terminal, associates the data and the title attribute information table which are received by the connection unit, stores the associated data and the title attribute information table in the memory unit, when the control unit displays the title of a predetermined data in the data on the display unit, the control unit refers to the title attribute information table associated with the data and the title information file, specifies the two values included in the title information file from the title attribute information table and creates the title by combining the two values, and the display unit displays the title created by the control unit.

According to the above configuration, the communication terminal transmits and receives the title attribute information table which is associated with the data together with the data. The title attribute information table has at least the date information and the name information as the attribute information of the title. Accordingly, the communication terminal can use the transmission/reception date of the data, for example, as the title of the data without changing a form or a standard of the transmitted/received data. Moreover, according to the above configuration, the communication terminal can use the creation date, the transmission date, the reception date, or an optional name included in the title attribute information table as the title of the data. Furthermore, according to the above configuration, the communication terminal creates the title of the data in accordance with the two values selected by the user in the creation date, the transmission date, the reception date, or the optional name. Accordingly, the communication terminal can create the unified title for the plural data, so that the display unit can display the created title with the high visibility. Moreover, since the user can display the title based on the attribute information which is useful for the user, the user can easily manage the data in accordance with the title.

According to still another aspect of the present invention, when the title information file has a value included in the date information, a date display information regarding to a display form of a date is inputted to the input unit by a user and the control unit makes the title information file have the date display information and creates the title in a display form based on the date display information.

According to the above configuration, the user determines the display form of the date included in the title, so that the user can display the title including the date in a display form which suits the user's taste on the display unit.

According to another aspect of the present invention, the connection unit transmits and receives the title information file associated with the data together with an e-mail to which the data is attached and when the e-mail and the title attribute information table are transmitted and received by the connection unit, the control unit stores the transmission date or the reception date in the title attribute information table, and when the data is attached to the e-mail via the input unit, the title of the data is determined as a subject of the e-mail.

According to the above configuration, when the communication terminal transmits and receives the data using the e-mail, the communication terminal transmits and receives the title attribute information table with the data. Accordingly, the communication terminal can use the attribute information of the data as the title without changing a form or a standard of the data attached to the e-mail. Moreover, the communication terminal determines the title of the data attached to the e-mail as the subject of the e-mail. Accordingly, the title and the subject of the data are uniformed, so that the user can manage the e-mail to which the data is attached easily and efficiently.

According to still another aspect of the present invention, the control unit creates a combination of unique characters or numbers as an auto-creation name, the title attribute information table further has a data type information which has a value regarding a type of the data, an equipment information which has a value regarding the communication terminal, and a creator information which has a value regarding a creator of the data, the date information further has an updated date when the data is updated and an access date when the data is referenced, the name information further has the auto-creation name as a name of the data, the data type information has an extension of the data and an application name of an application used for creating the data, the equipment information has a computer name allocated to the communication terminal by a user and a model name allocated to the communication terminal by a manufacturer, the creator information has a creator name which is a name of a person who newly creates the data, an update person name which is a name of a person who updates the data, an access person name which is a name of a person who refers to the data, a sender name which is a name of a person who transmits the data, and a receiver name which is a name of a person who receives the data, and the title information file has two values which a user selects via the input unit from the values included in the date information, the name information, the data type information, the equipment information, or the creator information.

According to the above configuration, the control unit creates the combination of the unique characters or numbers as the auto-creation name. Accordingly, the communication terminal can automatically provide the auto-creation name to the data. Moreover, the communication terminal can create the title of the data in accordance with the two values selected by the user in the creation date, the transmission date, the reception date, the updated date, the access date, the optional name, the auto-creation name, the extension, the application name, the computer name, the model name, the creator name, the update person name, the access person name, the sender name, and the receiver name.

According to still another aspect of the present invention, a data transmission/reception program for transmitting and receiving data using plural computers, each of which includes an input unit, which is connected to a telecommunication line and a character information or an operating command is inputted to by a user, a display unit which displays data which is made up of a file or a folder, a connection unit which transmits and receives the data via the telecommunication line, a control unit which controls the input unit, the display unit, and the connection unit, and a memory unit which stores a control program to control the control unit, the data transmission/reception program of the computer includes steps of: storing, in the memory unit, a title attribute information table which is used for creating a title of the data and has an attribute information of the data in association with the data and a title information file which has information for creating the title of the data displayed on the display unit in accordance with the attribute information included in the title attribute information table; storing, in the title attribute information table, at least a date information, which has a value regarding a date when the data is created or a date when the data is transmitted or received by the connection unit, and a name information, which has a value regarding a name of the data; storing, in the date information, a creation date when the data is newly created, a transmission date when the data is transmitted by the connection unit, or a reception date when the data is received by the connection unit; storing, in the name information, an optional name which a user optionally provides as a name of the data via the input unit; making the control unit control the connection unit to transmit the data and the title attribute information table to the other computer; making the control unit associate the data and the title attribute information table which are received by the connection unit and store the associated data and the title attribute information table in the memory unit; making the control unit refer to the title attribute information table associated with the data and the title information file, specify the two values included in the title information file from the title attribute information table associated with a predetermined data in the data, and create the title by combining the two values when the control unit displays the title of the data on the display unit, and making the display unit display the title created by the control unit.

According to the above configuration, the user can use the transmission/reception date of the data, for example, as the title of the data without changing a form or a standard of the transmitted/received data using the computer. Moreover, according to the above configuration, the user can use the creation date, the transmission date, the reception date, or the optional name included in the attribute information table as the title using the computer. Furthermore, according to the above configuration, the user can display the title based on the attribute information which is useful for the user on the display unit with the high visibility, using the computer. Accordingly, the user can easily manage the data in accordance with the title.

According to still another aspect of the present invention, the data transmission/reception program includes steps of: inputting a date display information regarding to a display form of a date to the input unit by a user when the title information file has a value included in the date information, and making the control unit control the title information file to have the date display information and create the title in a display form based on the date display information.

According to the above configuration, the user can display the title including the date in a display form which suits the user's taste on the display unit using the computer.

According to still another aspect of the present invention, the data transmission/reception program of the computer includes steps of making the control unit transmit and receive the title information file associated with the data together with an e-mail to which the data is attached; making the control unit store the transmission date or the reception date in the title attribute information table when the e-mail and the title attribute information table are transmitted and received by the connection unit, and making the control unit determine the title of the data as a subject of the e-mail when the data is attached to the e-mail via the input unit.

According to the above configuration, the user can use the attribute information of the data without changing a form or a standard of the data attached to the e-mail, using the computer. Moreover, since the user can uniform the title and the subject of the data using the computer, the user can manage the e-mail to which the data is attached easily and efficiently.

According to still another aspect of the present invention, the data transmission/reception program includes steps of: making the control unit create a combination of unique characters or numbers as an auto-creation name; further storing, in the title attribute information table, a data type information which has a value regarding a type of the data, an equipment information which has a value regarding the communication terminal, and a creator information which has a value regarding a creator of the data; further storing, in the date information, an updated date when the data is updated and an access date when the data is referenced; further storing, in the name information, the auto-creation name as a name of the data; storing, in the data type information, an extension of the data and an application name of an application used for creating the data; storing, in the equipment information, a computer name allocated to the communication terminal by a user and a model name allocated to the communication terminal by a manufacturer; storing, in the creator information, a creator name which is a name of a person who newly creates the data, an update person name which is a name of a person who updates the data, an access person name which is a name of a person who refers to the data, a sender name which is a name of a person who transmits the data, and a receiver name which is a name of a person who receives the data, and storing, in the title information file, two values which a user selects via the input unit from the values included in the date information, the name information, the data type information, the equipment information, or the creator information.

According to the above configuration, the user can automatically provide the auto-creation name to the data using the computer. Moreover, the user create the title of the data in accordance with the two values in the creation date, the transmission date, the reception date, the updated date, the access date, the optional name, the auto-creation name, the extension, the application name, the computer name, the model name, the creator name, the update person name, the access person name, the sender name, and the receiver name using the computer.

BRIEF DESCRIPTION OF THE DRAWINGS

FIG. 2 is a configuration diagram of a computer according to the present preferred embodiment.

FIG. 3 is a configuration diagram of a title attribute information table according to the present preferred embodiment.

FIG. 5 is a diagram showing an example of a title setting screen in the computer according to the present preferred embodiment.

FIG. 6 is a diagram showing an example of a date display setting screen of in the computer according to the present preferred embodiment.

FIG. 14 is a diagram showing an example of a conventional data list display screen.

Figure 1:
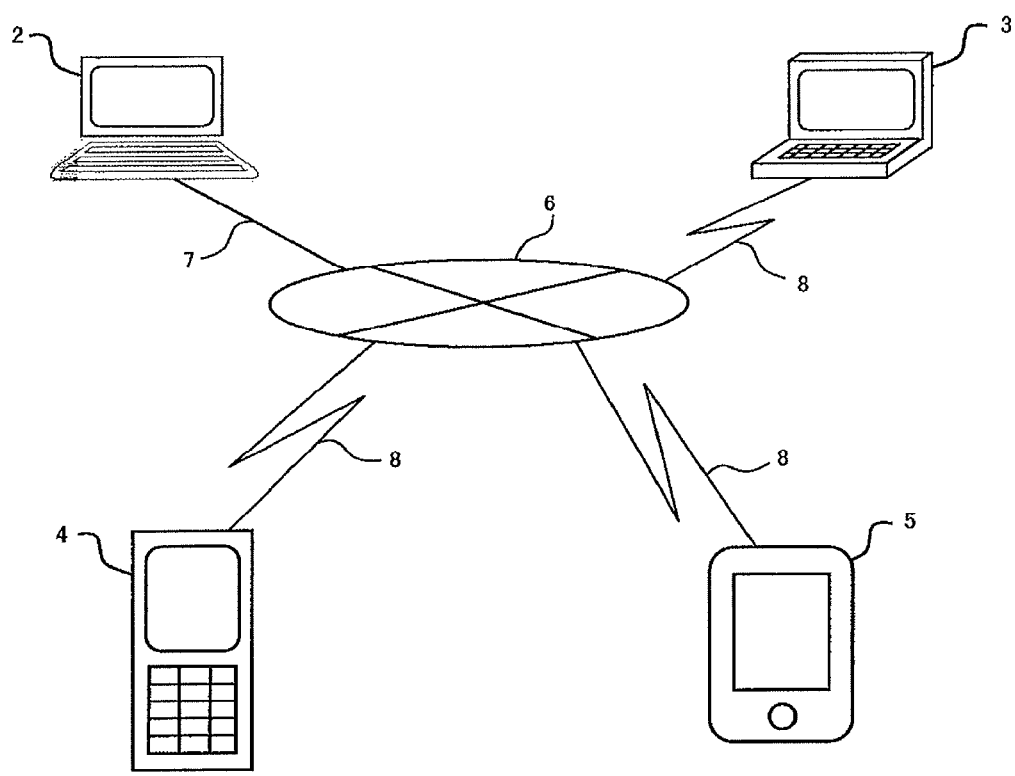
FIG. 1 is a configuration diagram of a data transmission/reception system according to a preferred embodiment of the present invention.

DESCRIPTION OF THE NUMERALS 1 data transmission/reception system
2 computer (communication terminal)
3 notebook computer (communication terminal)
4 mobile phone (communication terminal)
5 portable music player (communication terminal)
6 Internet (telecommunication line)
9 CPU (control unit)
10 control program
11 memory unit
12 input unit
14 monitor (display unit)
16 connection unit
31 title attribute information table
32 title information file

DESCRIPTION OF THE PREFERRED EMBODIMENTS

A data transmission/reception system according to a first preferred embodiment of the present invention is described with reference to the drawings. FIG. 1 shows a configuration of a data transmission/reception system 1 according to the present preferred embodiment. The data transmission/reception system 1 includes a desktop computer 2, a laptop notebook computer 3, a mobile phone 4, and a portable music player 5 as communication terminals to transmit and receive data such as a file or a folder, for example, and an Internet 6 (telecommunication line) connected to the computer 2, the notebook computer 3, the mobile phone 4, and the portable music player 5. The computer 2 is connected to the Internet 6 via a wired cable 7, and the notebook computer 3, the mobile phone 4, and the portable music player 5 are connected to the Internet 6 via a wireless signal 8.

FIG. 2 shows a configuration of the computer 2. The computer 2 includes a CPU 9 (control unit) which controls a whole apparatus, a memory unit 11 which stores a control program 10 to control the whole apparatus, an input control unit 13 which controls an input unit 12 to which a character information or an operating command is inputted, a monitor control unit 15 which controls a monitor 14 (display unit) to display data or the character information, a connection control unit 17 which controls a connection unit 16 connected to the Internet 6 via the wired cable 7 or the wireless signal 8, a power control unit 18 which controls a power supply to the computer 2, a memory card control unit 20 which controls a memory card slot 19, an imaging control unit 22 which controls an imaging unit 21 to take a picture, a speaker control unit 24 which controls a speaker 23, a voice recognition control unit 26 which controls a voice recognition unit 25 to recognize a voice, and a position sensor control unit 28 which controls a position sensor 27 to specify a position of the computer 2 by a latitude and a longitude based on GPS (Global Positioning System) information, and they are connected to a bus 29. Here, the input unit 12 is a keyboard, a mouse, a numerical keypad, or a touch panel, for example.

The memory unit 11 stores data 30 such as a document file, an image data, a music data, a folder, or the like, a title attribute information table 31 which has an attribute information used for creating a title for the data 30, and a title information file 32 which has information regarding the title of the data 30. The title attribute information table 31 is associated with the data 30 and stored in the memory unit 11. The title attribute information table 31 has a creation date when the data 30 is created, a transmission/reception date when the data 30 is transmitted or received, an extension of the data, or the like as the attribute information. The title information file 32 has the information regarding the title of the data 30 displayed on the monitor 14. The title information file 32 is used when the title of the data 30 is created by the CPU 9.

FIG. 3 shows a configuration of the title attribute information table 31 stored in the memory unit 11. The title attribute information table 31 has a date information item 33 which has information regarding a date of the data 30, a name information item 34 which has information regarding a name of the data 30, a data type information item 35 which has information regarding a type of the data 30, an equipment information item 36 which has information regarding an equipment which creates the data 30, and a creator information item 37 which has information regarding a creator who creates the data 30 or the like.

The date information item 33 has a creation date 38 when the data 30 is created, an updated date 39 when the data 30 is updated, an access date 40 when the data 30 is referenced, a transmission date 41 when the data 30 is transmitted to another communication terminal, and a reception date 42 when the data 30 is received from another communication terminal. The name information item 34 has an optional name 43 which the user optionally provides to the data 30 and an auto-creation name 44 which the CPU 9 automatically provides to the data 30. The auto-creation name 44 is a unique character string which the CPU 9 provides every time the data 30 is newly created. The data type information item 35 has an extension 45 of the data 30 and an application name 46 which is used for creating the data 30. The equipment information item 36 has a computer name 47 which the user provides to the computer 2, which creates the data 30, and a model name 48 which a manufacturer of the computer 2 provides to the computer 2. The creator information item 37 has a creator name 49 which is a name of a person who creates the data 30, an update person name 50 which is a name of a person who updates contents of the data 30, an access person name 51 which is a name of a person who refers to the data 30, a sender name 52 which is a name of a person who transmits the data 30, and a receiver name 53 which is a name of a person who receives the data 30. Here, the computer name 47 and the model name 48 are stored in the memory unit 11. Moreover, each of the creator name 49, the update person name 50, and the access person name 51 is a user name which is inputted when the user logs in to the computer 2, for example. The creator name 49 may also be a name of an author, an editor, a publisher, an owner of copyright, or the like. Moreover, each of the sender name 52 and the receiver name 53 is a person's name or appellative, for example, which is associated with an e-mail address and stored in the memory unit 11. In case that the data 30 is a personal data such as a medical record including a medical history, for example, and its confidentiality should be maintained, the creator name 49 may also be a name of an administrator. Moreover, the title attribute information table 31 may also have the latitude and the longitude specified by the position sensor 27.

Figure 4:
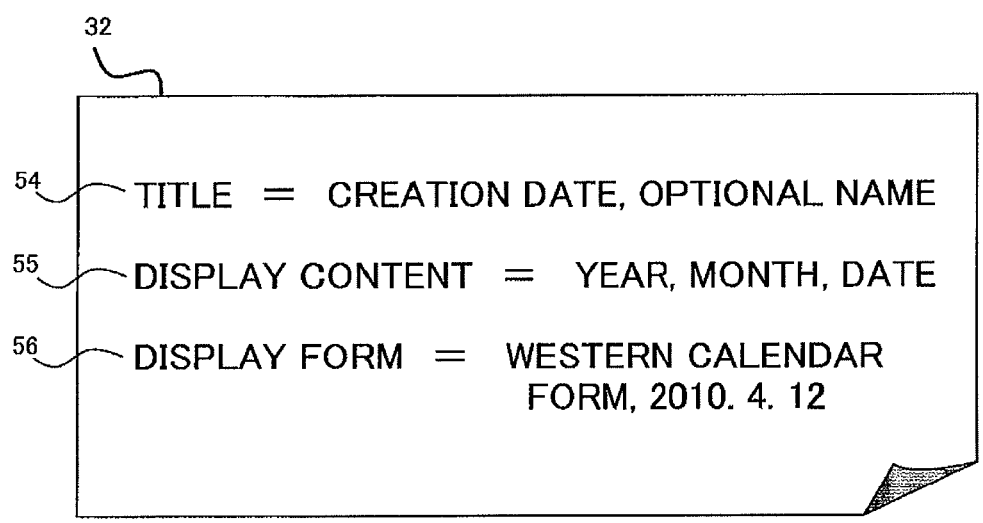
FIG. 4 is a configuration diagram of a title information file according to the present preferred embodiment.

FIG. 4 shows a configuration of the title information file 32 stored in the memory unit 11. The title information file 32 includes a title 54 of the data 30 displayed on the monitor 14, a display content 55 which indicates which of a year, a month, and a date is displayed on the monitor 14 when the year, the month, and the date are included in the title 54, and a display form 56 which indicates a form of the year, the month, and the date included in the title 54 which is displayed on the monitor 14. The title 54 has two values of the creation date 38 to the receiver name 53 included in the title attribute information table 31. In FIG. 4, the title 54 has "the creation date and the optional name". It indicates that the title 54 displayed on the monitor 14 is made up of a combination of the creation date 38 and the optional name 43. When the title 54 has one of the creation date 38 to the reception date 42 included in the date information item 33, the title information file 32 has the display content 55 and the display form 56 in addition to the title 54.

The display content 55 indicates which of the year, the month, the date, the year and month, the month and date, and the year, month, and date is displayed on the monitor 14. In FIG. 4, the display content 55 has "the year, month, and date". It indicates that the year, month, and date of the creation date 38 included in the title 54 is displayed on the monitor 14. Moreover, the display form 56 has information which indicates whether the creation date 38 to the reception date 42 are displayed in era form using era names or in Western calendar form using A.D. on the monitor 14 and information which indicates whether the creation date 38 to the reception date 42 are displayed by Chinese characters, numeric characters, or alphabets on the monitor 14. In FIG. 4, the display form 56 has "A.D. 2010. 4. 12". It indicates that the year, month, and date of the creation date 38 included in the title 54 are displayed by the numeric characters in the Western calendar form on the monitor 14. In FIG. 4, "2012. 4. 12" indicates a display example of the creation date 38 displayed on the monitor 14. When the user sets the title information file 32 via the input unit 12 in the computer 2, the two values of the creation date 38 to the reception date 42 included in the title attribute information table 31 can be determined as the title 54 of the data 30. Accordingly, the user can create the title 54 which is useful for the user without changing the form or the standard of the data 30.

FIG. 5 shows a title setting screen 57 displayed on the monitor 14. The title setting screen 57 is a setting screen for creating the title 54 of the data 30 based on the title attribute information table 31 and is set individually by the user in the computer 2, the notebook computer 3, the mobile phone 4, and the portable music player 5. The title setting screen 57 displays a date information window 58 which displays the creation date 38, the updated date 39, the access date 40, the transmission date 41, and the reception date 42 in the title attribute information table 31 together with check boxes, a name information window 59 which displays the optional name 43 and the auto-creation name 44 in the same manner, a data type information window 60 which displays the extension 45 and the application name 46 in the same manner, an equipment information window 61 which displays the computer name 47 and the model name 48 in the same manner, a creator information window 62 which displays the creator name 49, the update person name 50, the access person name 51, a sender name 52, and the receiver name 53 in the same manner, and an enter button 63 to determine contents of the check boxes checked by the user.

The user checks the two check boxes of the check boxes displayed on the date information window 58, the name information window 59, the data type information window 60, the equipment information window 61, or the creator information window 62 and presses the enter button 63. The CPU 9 creates the title information file 32 based on values corresponding to the checked two check boxes and stores the title information file 32 in the memory unit 11. In FIG. 5, the check boxes of the creation date 38 in the date information window 58 and the optional name 43 in the name information window 59 are checked. The title setting screen 57 displays the value corresponding to the checked two check boxes in boldface. Accordingly, the user can visually recognize the checked value.

When the check boxes of the creation date 38 and the optional name 43 are checked, the CPU 9 displays the character string combining the creation date 38 and the optional name 43 as the title 54 on the monitor 14. As described above, the user can display the title 54 which is made up of the attribute information useful for the user on the monitor 14. The computer 2, the notebook computer 3, the mobile phone 4, and the portable music player 5 display the titles 54 for all the data 30, which are stored in the memory unit 11 based on the title information file 32, on the monitor 14. Accordingly, the user can manage the data 30 using the unified titles 54, so that the desired data 30 can easily be specified from a number of data 30 in accordance with the title 54. Moreover, since the titles 54 are unified, the monitor 14 can display the plural titles 54 with high visibility. When the check box of the transmission date or the reception date in the date information window 58 is checked in FIG. 5, the monitor 14 displays the title 54 including the transmission date or the reception date. Accordingly, the user can recognize the transmission/reception record of the data 30.

FIG. 6 shows a date display setting screen 64 displayed on the monitor 14. When one of the check boxes displayed on the date information window 58 is checked in the title setting screen 57, the date display setting screen 64 is displayed on the monitor 14. The date display setting screen 64 displays a display content window 65 which displays the year, the month, the date, the year and month, the month and date, and the year, month, and date, together with check boxes, a display form window 66 which displays the era form and the Western calendar form in the same manner, and an enter button 67 to determine contents of the check boxes checked by the user. The display form window 66 displays a display example 68, which indicates how the year, the month, or the date is displayed by the Chinese characters, the numeric characters, or the alphabets on the monitor 14, together with the check boxes.

When the user checks one of the check boxes of the year, the month, the date, the year and month, the month and date, and the year, month, and date displayed on the display content window 65, the user can determine which content of the year, the month, and the date is displayed on the monitor 14. Moreover, when the user selects the era form or the Western calendar form displayed on the display form window 66 and the display example 68, the user can determine the display form of the year, the month, and/or the date displayed on the monitor 14. The CPU 9 makes the title information file 32 include the display content 55 and the display form 56 in accordance with the checked contents. In FIG. 6, "the year, month, and date" is selected in the display content window 65, and "the Western calendar form" and "2010. 4. 12" are selected in the display form window 66. The date display setting screen 64 displays the value corresponding to the checked check boxes in boldface. Accordingly, the user can visually recognize the checked value. When the check boxes of "the year, month, and date", "the Western calendar form", and "2010. 4. 12" are checked, the CPU 9 displays the creation date 54 included in the title 54 as "2010. 4. 12", for example, on the monitor 14. Accordingly, the user can display the year, the month, and/or the date included in the title 54 on the monitor 14 in the desired form.

Figure 7:
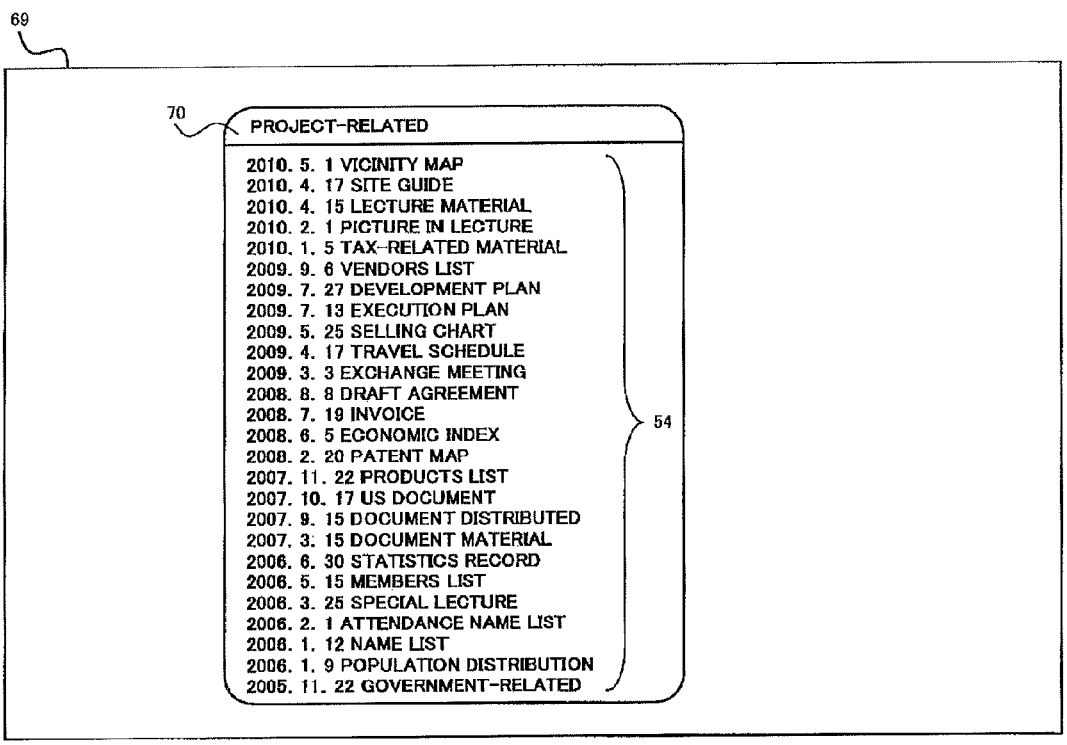
FIG. 7 is a diagram showing an example of a title list screen in the computer according to the present preferred embodiment.

FIG. 7 shows an example of a title list screen 69 displayed on the monitor 14 in the computer 2. The title list screen 69 displays a folder 70 which has the plural data 30. The folder 70 displays the titles 54 for the plural data 30. In FIG. 7, the monitor 14 displays the plural titles 54 which are created based on the title attribute information table 31 and the title information file 32 in the folder 70 in left-aligned form. All the titles 54 are created by the same standard based on the two values included in the title attribute information table 31. Accordingly, since the plural titles 54 are displayed as the character strings, which are easily understood by the user, on the title list screen 69, the user can specify the desired data 30 in accordance with the title 54 easily and quickly.

Figure 8:
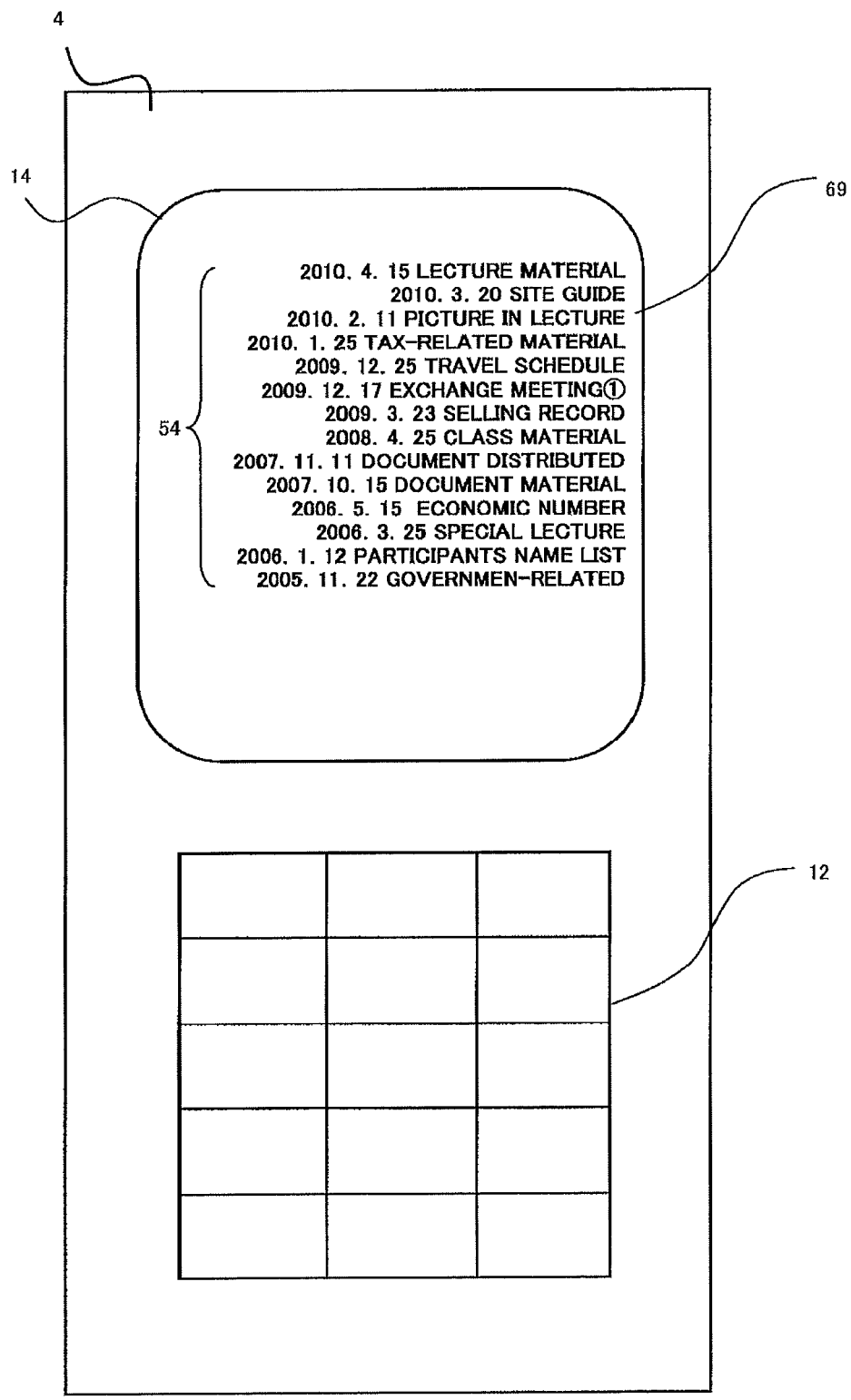
FIG. 8 is a diagram showing an example of a title list screen in a mobile phone according to the present preferred embodiment.

Next, a case of displaying the plural titles 54 on the monitor 14 in the mobile phone 4 is described. FIG. 8 shows an example of the title list screen 69 displayed on the monitor 14 in the mobile phone 4. The monitor 14 displays the plural titles 54 which are created based on the title attribute information table 31 and the title information file 32 in right-aligned form. Since all the titles 54 are created by the same standard based on the two values included in the title attribute information table 31, the character strings of the titles 54 do not become extremely long. Accordingly, even the mobile phone 4 or the portable music player 5, whose monitor 14 is smaller than that of the computer 2 or the notebook computer 3, can display the plural titles 54 with the high visibility.

Figure 9:
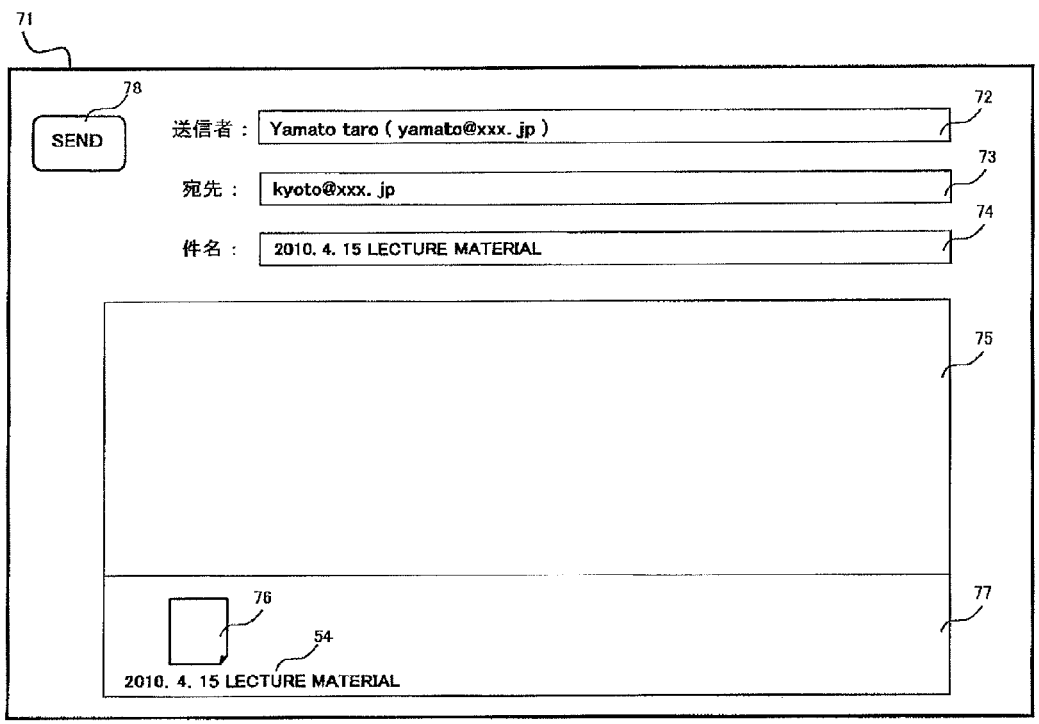
FIG. 9 is a diagram showing an example of an e-mail (electronic mail) creation screen in the computer according to the present preferred embodiment.

FIG. 9 shows an example of an e-mail (electronic mail) creation screen 71 displayed on the monitor 14 in the computer 2. The e-mail creation screen 71 displays a sender input box 72 to which a name or an e-mail address of a sender who transmits an e-mail is inputted, an address input box 73 to which an e-mail address of a receiver who receives the e-mail is inputted, a subject input box 74 to which a subject of the e-mail is inputted, a text input box 75 to which a text of the e-mail is inputted, an attached file box 77 to attach an attached file 76 to the e-mail, and a send button 78 to transmit the e-mail.

The sender of the e-mail inputs the name or the e-mail address of the sender to the sender input box 72, inputs the e-mail address of the receiver to the address input box 73, and inputs the text of the e-mail to the text input box 75. Moreover, the user displays the attached file 76 which is attached to the e-mail on the attached file box 77. In FIG. 9, the attached file 76 is the data 30 whose title 54 is "2010. 4. 15 lecture material", and the attached file box 77 displays the attached file 76 by an icon. When the attached file 76 is attached to the e-mail, the subject input box 74 displays the title 54 of the attached file 76 displayed on the attached file box 77 as the subject of the e-mail. The sender presses the send button 78 to transmit the e-mail.

When the attached file 76 is attached to the e-mail, the title 54 of the attached file 76 becomes the subject of the e-mail. Accordingly, the sender and the receiver of the e-mail can recognize the content of the attached file 76 without confirming the content of the e-mail just by reference to the subject of the e-mail from many transmitted/received e-mails. Moreover, the sender can manage the e-mail in accordance with the subject of the e-mail to which the attached file 76 is attached in the same manner as the sender manages the data 30 in accordance with the title 54 of the data 30.

Figure 10:
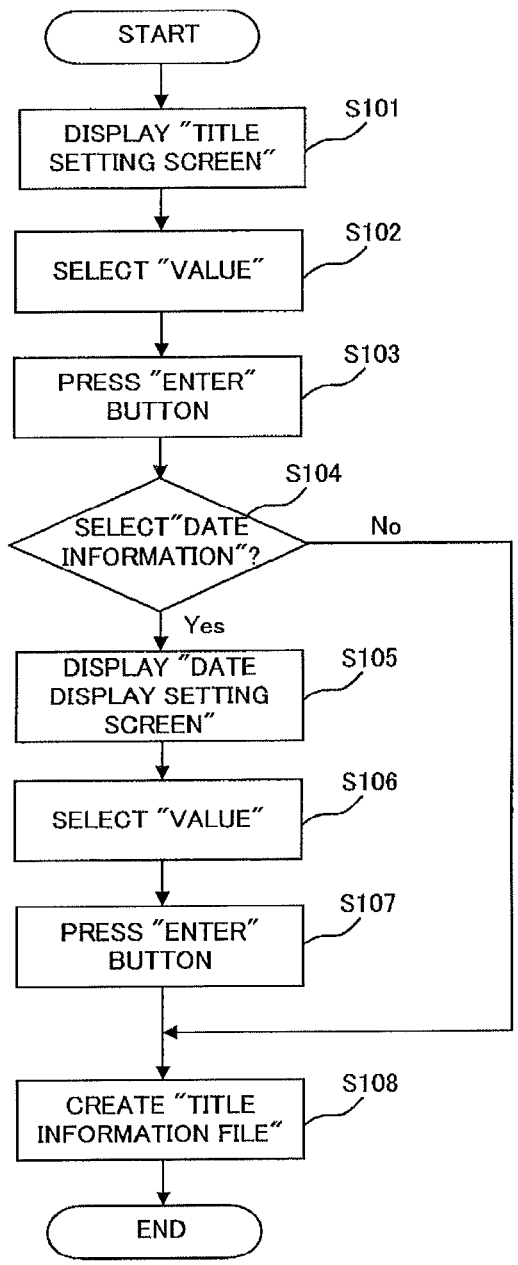
FIG. 10 is a flow chart of a title information file creation processing according to the present preferred embodiment.

Next, a process of creating the title information file 32 is described. FIG. 10 shows a flow chart of a title information file creation processing to create the title information file 32. When a command of displaying the title setting screen 57 on the monitor 14 is inputted via the input unit 12, the CPU 9 displays the title setting screen 57 on the monitor 14 (S101). The title setting screen 57 displays the plural values selected as the title 54 together with the check boxes. When the two check boxes are checked via the input unit 12, the two values are selected from the plural values (S102). Subsequently, when the enter button 63 displayed on the title setting screen 57 is pressed (S103), the CPU 9 determines whether or not the selected two values include the value displayed on the date information window 58 (S104).

When the selected two values include the value displayed on the date information window 58 in the step S104 (Yes in S104), the PUC 9 displays the date display setting screen 64 on the monitor 14 (S105). The date display setting screen 64 displays the display content window 65 and the display form window 66, and the display content window 65 and the display form window 66 display the values for determining the display form of the date together with the check boxes. When the check boxes are checked via the input unit 12, the plural values displayed on the display content window 65 and the display form window 66 are selected (S106). In the present preferred embodiment, the user selects one of the year, the month, the date, the year and month, the month and date, and the year, month, and date displayed on the display content window 65, either the era form or the Western calendar form displayed on the display form window 66, and one of the plural display examples 68. Subsequently, when the enter button 67 displayed on the date display setting screen 64 is pressed (S107), the CPU 9 creates the title information file 32 in accordance with the values selected in the title setting screen 57 and date display setting screen 64 and stores the title information file 32 in the memory unit 11 (S108).

In contrast, when the value displayed on the date information window 58 is not included in the selected two value in the step S104 (No in S104), the CPU 9 creates the title information file 32 in accordance with the values selected in the title setting screen 57, stores the title information file 32 in the memory unit 11 (S108), and completes the title information file creation processing. As described above, when the user selects the values displayed on the title setting screen 57 or the date display setting screen 64, the user can manage the data 30 using the title 54 which is useful for the user without changing the form or the standard of the data 30. The title information file creation processing is executed as a default setting when the communication terminal is used by a new user, for example.

Figure 11:
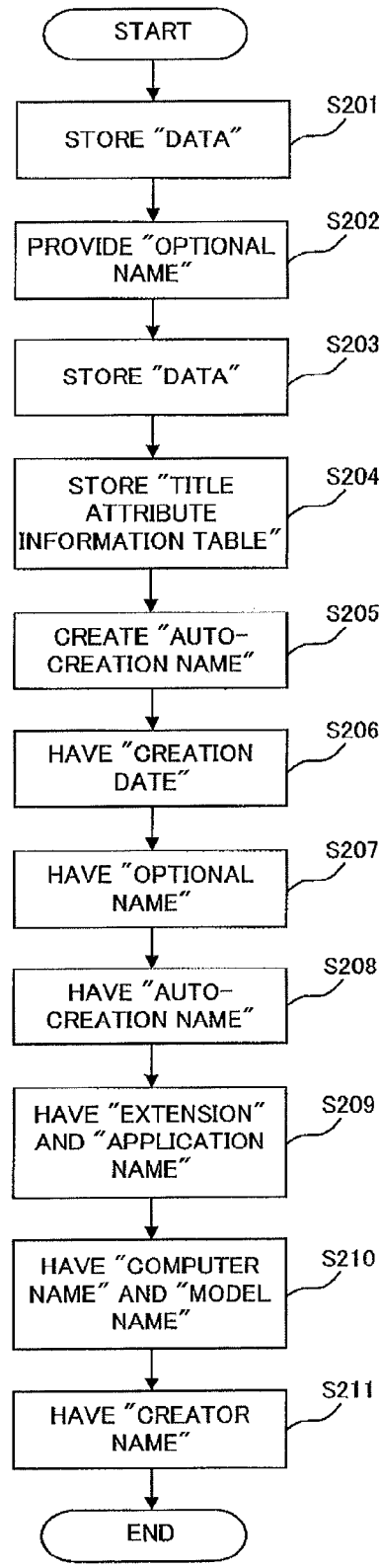
FIG. 11 is a flow chart of a title attribute information table creation processing according to the present preferred embodiment.

Next, a process of creating the title attribute information table 31 is described. FIG. 11 shows a flow chart of a title attribute information table creation processing to create the title attribute information table 31. A case of newly creating the data 30 is described below. When the newly-created data 30 is stored (S201) and the optional name 43 is provided to the data 30 via the input unit 12 (S201), the CPU 9 stores the data 30 in the memory unit 11 (S203). The CPU 9 creates the title attribute information table 31 in association with the data 30 and stores the title attribute information table 31 in the memory unit 11 (S204). Subsequently, the CPU 9 refers to all the title attribute information table 31 stored in the memory unit 11 and create the unique character string as the auto-creation name 44 (S205).

The CPU 9 makes the title attribute information table 31 include the creation date 38 of the created data 30 (S206). The CPU 9 makes the title attribute information table 31 include the optional name 43 inputted via the input unit 12 (S207). Subsequently, the CPU 9 makes the title attribute information table 31 include the auto-creation name 44 (S208). The CPU 9 makes the title attribute information table 31 include the extension 45 of the created data 30 and the application name 46 used for creating the data 30 (S209). The CPU 9 makes the title attribute information table 31 include the computer name 47 and the model name 48 (S210). The CPU 9 makes the title attribute information table 31 include the creator name 49 (S210) and completes the title attribute information table creation processing. Accordingly, the user can store the title attribute information table 31 which is associated with the data 30 just by storing the newly-created data 30 in the memory unit 11.

Figure 12:
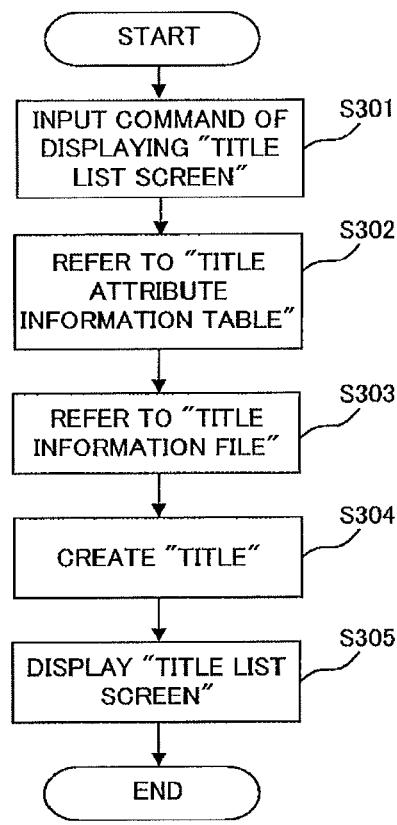
FIG. 12 is a flow chart of a title list screen display processing according to the present preferred embodiment.

Next, a process of displaying the title list screen 69 is described. FIG. 12 shows a flow chart of the title list screen display processing to display the title list screen 69. In the present preferred embodiment, the title list screen 69 displays the plural titles 54. When a command of displaying the title list screen 69 is inputted via the input unit 12 (S301), the CPU 9 refers to the title attribute information table 31 stored in the memory unit 11 (S302). Moreover, the CPU 9 refers to the title information file 32 stored in the memory unit 11 (S303). The CPU 9 creates the titles 54 for the plural data 30 in accordance with the referenced title attribute information table 31 and title information file 32 (S304). Subsequently, the CPU 9 displays the created plural titles 54 on the title list screen 69 (S305) and completes the title list screen display processing. Accordingly, the user can display the plural titles 54 on the monitor 14 with the high visibility.

Figure 13:
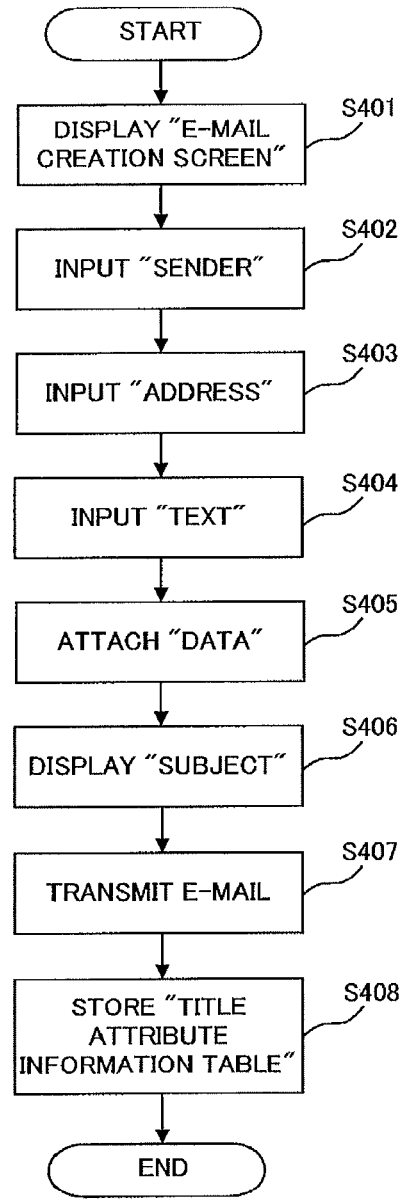
FIG. 13 is a flow chart of an e-mail transmission processing according to the present preferred embodiment.

Next, a process of transmitting the e-mail is described. FIG. 13 shows a flow chart of an e-mail transmission processing to transmit the e-mail. When a command of displaying the e-mail creation screen 71 is inputted via the input unit 12, the CPU 9 displays the e-mail creation screen 71 on the monitor 14 (S401). When the name or the e-mail address of the sender is inputted to the sender input box 72 in the e-mail creation screen 71 (S402), when the e-mail address of the receiver who receives the e-mail is inputted to the address input box 73 (S403), and when the text is inputted to the text input box 75

(S404), the CPU 9 creates the e-mail. Subsequently, when the data 30 is attached to the e-mail as the attached file 76, the CPU 9 displays the attached file 76 on the attached file box 77 (S405).

The CPU 9 displays the title 54 of the attached file 76, which is displayed on the attached file box 77, as the subject of the e-mail on the subject input box 74 (S406). When the send button 78 is pressed, the CPU 9 transmits the e-mail to which the attached file 76 is attached and the title attribute information table 31 which is associated with the attached file 76 (S407). The communication terminal which receives the e-mail stores the received e-mail, attached file 76, and title attribute information table 31 which is associated with attached file 76 in the memory unit 11 (S408) and completes the e-mail transmission processing. The user can determine the title 54 of the data 30 as the subject of the e-mail when the data 30 is attached to the e-mail as the attached file 76. Accordingly, user can easily manage the e-mail to which the attached file 76 is attached. Moreover, the communication terminal transmits the title attribute information table 31 associated with the attached file 76 together with the e-mail. Accordingly, the communication terminal which receives the e-mail can create the title 54 of the attached file 76 using the received title attribute information table 31.

The present invention is not limited to the configuration of the above preferred embodiment, however, various modifications are applicable, and the data transmission/reception system may also be configured to include a digital photo frame, a television, or a car navigation system having a communication function as a communication terminal other than the desktop computer 2, the laptop notebook computer 3, the mobile phone 4, and the portable music player 5. Moreover, when the data 30 is a music data, the title attribute information table 31 may also be configured to have a composer name, an arranger name, or a player name of the music data as the creator information item 37, for example. Furthermore, the title list screen 69 may also be configured to display the plural titles 54 in center-aligned form instead of the left-aligned form or the right-aligned form.

What is claimed is:

1. A data transmission/reception system which comprises plural communication terminals and a telecommunication line connected to the communication terminals to transmit and receive data which is made up of a file or a folder, wherein
each of the communication terminals comprises an input unit to which a character information or an operating command is inputted by a user, a display unit which displays the data, a connection unit which transmits and receives the data via the telecommunication line, a control unit which controls the communication terminals, and a memory unit which stores a control program to control the control unit, wherein
the memory unit stores a title attribute information table which is used for creating a title of the data and has an attribute information of the data in association with the data and a title information file which has information for creating the title of the data displayed on the display unit in accordance with the attribute information included in the title attribute information table,
the title attribute information table has at least a date information, which has a value regarding a date when the data is created and a date when the data is transmitted or received by the connection unit, and a name information, which has a value regarding a name of the data,
the date information has a creation date when the data is newly created, a transmission date when the data is transmitted by the connection unit, or a reception date when the data is received by the connection unit,
the name information has an optional name which a user optionally provides as a name of the data via the input unit,
the title information file has two values which a user selects via the input unit from the values included in the date information or the name information,
the control unit makes the connection unit transmit the data and the title attribute information table to the other communication terminal, associates the data and the title attribute information table which are received by the connection unit, stores the associated data and the title attribute information table in the memory unit,
when the control unit displays the title of a predetermined data in the data on the display unit, the control unit refers to the title attribute information table associated with the data and the title information file, specifies the two values included in the title information file from the title attribute information table and creates the title by combining the two values, and
the display unit displays the title created by the control unit.

2. The data transmission/reception system according to claim 1, wherein
when the title information file has a value included in the date information, a date display information regarding to a display form of a date is inputted to the input unit by a user and
the control unit makes the title information file have the date display information and creates the title in a display form based on the date display information.

3. The data transmission/reception system according to claim 1, wherein
the connection unit transmits and receives the title information file associated with the data together with an e-mail to which the data is attached and
when the e-mail and the title attribute information table are transmitted and received by the connection unit, the control unit stores the transmission date and the reception date in the title attribute information table, and when the data is attached to the e-mail via the input unit, the title of the data is determined as a subject of the e-mail.

4. The data transmission/reception system according to claim 1, wherein
the control unit creates a combination of unique characters or numbers as an auto-creation name,
the title attribute information table further has a data type information which has a value regarding a type of the data, an equipment information which has a value regarding the communication terminal, and a creator information which has a value regarding a creator of the data,
the date information further has an updated date when the data is updated and an access date when the data is referenced,
the name information further has the auto-creation name as a name of the data,
the equipment information has a computer name allocated to the communication terminal by a user and a model name allocated to the communication terminal by a manufacturer,
the creator information has a creator name which is a name of a person who newly creates the data, an update person name which is a name of a person who updates the data, an access person name which is a name of a person who refers to the data, a sender name which is a name of a person who transmits the data, and a receiver name which is a name of a person who receives the data, and the title information file has two values which a user selects via the input unit from the values included in the date information, the name information, the data type information, the equipment information, or the creator information.

5. The data transmission/reception system according to claim 2, wherein the connection unit transmits and receives the title information file associated with the data together with an e-mail to which the data is attached and when the e-mail and the title attribute information table are transmitted and received by the connection unit, the control unit stores the transmission date and the reception date in the title attribute information table, and when the data is attached to the e-mail via the input unit, the title of the data is determined as a subject of the e-mail.

6. The data transmission/reception system according to claim 2, wherein the control unit creates a combination of unique characters or numbers as an auto-creation name, the title attribute information table further has a data type information which has a value regarding a type of the data, an equipment information which has a value regarding the communication terminal, and a creator information which has a value regarding a creator of the data, the date information further has an updated date when the data is updated and an access date when the data is referenced, the name information further has the auto-creation name as a name of the data, the equipment information has a computer name allocated to the communication terminal by a user and a model name allocated to the communication terminal by a manufacturer, the creator information has a creator name which is a name of a person who newly creates the data, an update person name which is a name of a person who updates the data, an access person name which is a name of a person who refers to the data, a sender name which is a name of a person who transmits the data, and a receiver name which is a name of a person who receives the data, and the title information file has two values which a user selects via the input unit from the values included in the date information, the name information, the data type information, the equipment information, or the creator information.

7. A non-transitory computer-readable storage medium storing therein a data transmission/reception program for transmitting and receiving data using plural computers, each of which includes an input unit, which is connected to a telecommunication line and a character information or an operating command is inputted to by a user, a display unit which displays data which is made up of a file or a folder, a connection unit which transmits and receives the data via the telecommunication line, a control unit which controls the input unit, the display unit, and the connection unit, and a memory unit which stores a control program to control the control unit, the data transmission/reception program of the computer, when executed by a computer processor, to cause a computer to perform a method comprising steps of:

storing, in the memory unit, a title attribute information table which is used for creating a title of the data and has an attribute information of the data in association with the data and a title information file which has information for creating the title of the data displayed on the display unit in accordance with the attribute information included in the title attribute information table;

storing, in the title attribute information table, at least a date information, which has a value regarding a date when the data is created or a date when the data is transmitted or received by the connection unit, and a name information, which has a value regarding a name of the data;

storing, in the date information, a creation date when the data is newly created, a transmission date when the data is transmitted by the connection unit, or a reception date when the data is received by the connection unit;

storing, in the name information, an optional name which a user optionally provides as a name of the data via the input unit;

making the control unit control the connection unit to transmit the data and the title attribute information table to the other computer;

making the control unit associate the data and the title attribute information table which are received by the connection unit and store the associated data and the title attribute information table in the memory unit;

making the control unit refer to the title attribute information table associated with the data and the title information file, specify the two values included in the title information file from the title attribute information table associated with a predetermined data in the data, and create the title by combining the two values when the control unit displays the title of the data on the display unit, and making the display unit display the title created by the control unit.

8. The data transmission/reception program of the computer according to claim 7, when executed by the computer processor, to cause the computer to further perform the steps of:

inputting a date display information regarding to a display form of a date to the input unit by a user when the title information file has a value included in the date information, and making the control unit control the title information file to have the date display information and create the title in a display form based on the date display information.

9. The data transmission/reception program of the computer according to claim 7, when executed by the computer processor, to cause the computer to further perform the steps of:

making the connection unit transmit and receive the title information file associated with the data together with an e-mail to which the data is attached;

making the control unit store the transmission date and the reception date in the title attribute information table when the e-mail and the title attribute information table are transmitted and received by the connection unit, and making the control unit determine the title of the data as a subject of the e-mail when the data is attached to the e-mail via the input unit.

10. The data transmission/reception program of the computer according to claim 7, when executed by the computer processor, to cause the computer to further perform the steps of:

making the control unit create a combination of unique characters or numbers as an auto-creation name;

further storing, in the title attribute information table, a data type information which has a value regarding a type of the data, an equipment information which has a value regarding the communication terminal, and a creator information which has a value regarding a creator of the data;

further storing, in the date information, an updated date when the data is updated and an access date when the data is referenced;

further storing, in the name information, the auto-creation name as a name of the data;

storing, in the data type information, an extension of the data and an application name of an application used for creating the data;

storing, in the equipment information, a computer name allocated to the communication terminal by a user and a model name allocated to the communication terminal by a manufacturer;

storing, in the creator information, a creator name which is a name of a person who newly creates the data, an update person name which is a name of a person who updates the data, an access person name which is a name of a person who refers to the data, a sender name which is a name of a person who transmits the data, and a receiver name which is a name of a person who receives the data, and storing, in the title information file, two values which a user selects via the input unit from the values included in the date information, the name information, the data type information, the equipment information, or the creator information.

11. The data transmission/reception program of the computer according to claim 8, when executed by the computer processor, to cause the computer to further perform the steps of:

making the connection unit transmit and receive the title information file associated with the data together with an e-mail to which the data is attached;

making the control unit store the transmission date and the reception date in the title attribute information table when the e-mail and the title attribute information table are transmitted and received by the connection unit, and making the control unit determine the title of the data as a subject of the e-mail when the data is attached to the e-mail via the input unit.

12. The data transmission/reception program of the computer according to claim 7, when executed by the computer processor, to cause the computer to further perform the steps of:

making the control unit create a combination of unique characters or numbers as an auto-creation name;

further storing, in the title attribute information table, a data type information which has a value regarding a type of the data, an equipment information which has a value regarding the communication terminal, and a creator information which has a value regarding a creator of the data;

further storing, in the date information, an updated date when the data is updated and an access date when the data is referenced;

further storing, in the name information, the auto-creation name as a name of the data;

storing, in the data type information, an extension of the data and an application name of an application used for creating the data;

storing, in the equipment information, a computer name allocated to the communication terminal by a user and a model name allocated to the communication terminal by a manufacturer;

storing, in the creator information, a creator name which is a name of a person who newly creates the data, an update person name which is a name of a person who updates the data, an access person name which is a name of a person who refers to the data, a sender name which is a name of a person who transmits the data, and a receiver name which is a name of a person who receives the data, and storing, in the title information file, two values which a user selects via the input unit from the values included in the date information, the name information, the data type information, the equipment information, or the creator information.

* * * * *